United States Patent
Heitlinger et al.

(10) Patent No.: US 11,439,054 B2
(45) Date of Patent: Sep. 13, 2022

(54) BEARING ARRANGEMENT FOR A SIDE STABILIZER OF A REAR POWER LIFT

(71) Applicant: DEERE & COMPANY, Moline, IL (US)

(72) Inventors: Martin Heitlinger, Oestringen (DE); Sven Hildebrand, Dierbach (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/304,138

(22) Filed: Jun. 15, 2021

(65) Prior Publication Data

US 2022/0007562 A1 Jan. 13, 2022

(30) Foreign Application Priority Data

Jul. 10, 2020 (EP) ..................................... 20185277

(51) Int. Cl.
*A01B 63/118* (2006.01)
*B60B 35/16* (2006.01)
*B60G 9/00* (2006.01)

(52) U.S. Cl.
CPC ............ *A01B 63/118* (2013.01); *B60B 35/16* (2013.01); *B60G 9/003* (2013.01); *B60G 2200/31* (2013.01); *B60G 2204/148* (2013.01); *B60G 2204/4306* (2013.01); *B60G 2300/08* (2013.01)

(58) Field of Classification Search
None
See application file for complete search history.

(56) References Cited

U.S. PATENT DOCUMENTS 7,377,598 B2 * 5/2008 Doud .................... B60B 35/003
180/378

FOREIGN PATENT DOCUMENTS

| DE | 102015009889 A1 * | 2/2017 | ......... A01B 59/0415 |
| DE | 102015009889 A1 | 2/2017 | |
| EP | 1745685 A1 | 1/2007 | |
| EP | 2870845 A1 | 5/2015 | |
| EP | 3991530 A1 * | 5/2022 | |

OTHER PUBLICATIONS

European Search Report issued in counterpart application No. 20185277.9 dated Dec. 22, 2020 (05 pages).

* cited by examiner

*Primary Examiner* — Faye M Fleming

(57) ABSTRACT

A bearing arrangement is provided for a side stabilizer of a rear power lift for an agricultural utility vehicle. The arrangement includes a movable bearing and a bearing bracket for the bearing. The bearing bracket is disposable in an installed operating position to achieve a mechanical coupling of the bearing bracket with the rear power lift. An axle housing includes a central longitudinal axis for a rear axle of the utility vehicle. The bearing bracket has a bearing point for the movable bearing of the side stabilizer and is connected to the axle housing by a clamping force. The clamping force is oriented parallel to a traction force acting on the bearing point in the installed operating position.

20 Claims, 4 Drawing Sheets

BEARING ARRANGEMENT FOR A SIDE STABILIZER OF A REAR POWER LIFT

RELATED APPLICATIONS

This application claims priority to European Patent Application No. 20185277.9, filed Jul. 10, 2020, the disclosure of which is hereby expressly incorporated by reference in its entirety.

FIELD OF THE DISCLOSURE

The present disclosure relates to an arrangement for a bearing of a side stabilizer of a rear power lift which is used for an agricultural utility vehicle.

BACKGROUND

Conventional bearing arrangements contain an axle housing for a rear axle of a utility vehicle and a bearing bracket connected to the axle housing for a movable bearing of the side stabilizer. The mechanical connection between the axle housing and the bearing bracket is often implemented by a suitable clamping mechanism.

Thus, there is a need to improve a bearing arrangement for a side stabilizer of a rear power lift regarding its mechanical properties.

SUMMARY

According to the present disclosure, a bearing arrangement contains a bearing bracket for the bearing of a side stabilizer. This side stabilizer in the installed operating position of the bearing arrangement on an agricultural utility vehicle effects a mechanical coupling of the bearing bracket with a rear power lift. Moreover, the bearing arrangement contains an axle housing having a central longitudinal axis for a rear axle of the utility vehicle. The bearing bracket has a bearing point for the movable bearing of the side stabilizer. The bearing bracket is mechanically connected to the axle housing by a clamping force. In this case, the clamping force is oriented such that it runs parallel to a traction force which acts on the bearing point in the installed operating position. While the clamping force is oriented so as to be unchanged relative to the bearing arrangement, the traction force may act on the bearing point in different directions. In at least one direction of the action of the traction force on the bearing point, however, i.e., in at least one bearing position of the side stabilizer in the installed operating position, the clamping force is oriented parallel to the traction force. In other directions of the action of the traction force on the bearing point, i.e., in the other bearing positions of the side stabilizer, the clamping force may be oriented so as to be non-parallel to the traction force.

Directional deviations between the clamping force and the force acting on the side stabilizer in the installed operating position are significantly limited by this orientation of the clamping force. Thus the clamping means used may be subjected to a significantly higher level of stress in the direction of the traction force of the side stabilizer. This assists a cost-effective and small dimensioning of the clamping forces required or a reduced number of clamping mechanisms used, so as to achieve nonetheless a sufficiently stable mechanical connection between the axle housing and the bearing bracket.

The specific orientation of the clamping force provides the basis of a particularly efficient ratio between the traction forces of the side stabilizer and the connecting forces which effect a mechanical connection between the axle housing and the bearing bracket. The necessary connecting forces (for example, the clamping forces by a suitable connecting mechanism) may be significantly reduced. Additionally, undesired frictional forces between the axle housing and the bearing bracket, which may be produced during the operation of the side stabilizer, are reduced. The reduced mechanical stress between the axle housing and the bearing bracket also permits a smaller and thus cost-effective and space-saving dimensioning of the bearing bracket. Similarly, an optionally used mechanical connecting mechanism (for example, clamping pins, clamping screws) between the axle housing and the bearing bracket may also be dimensioned to be smaller and as a result cost-effective and space-saving.

The orientation of the clamping force relative to the traction force acting on the bearing point also permits an arrangement of the axle housing and the bearing bracket in series approximately in the vehicle longitudinal direction. This permits greater ground clearance of the utility vehicle in the region of its rear axle and a handling of the bearing bracket which is particularly easy to implement during the assembly of the bearing arrangement and the utility vehicle.

The movable bearing of the side stabilizer on the bearing point of the bearing bracket is configured, for example, as a bearing which is rotationally movable about a rotational axis. This rotational axis may run approximately horizontally and at the same time at an acute angle to the central longitudinal axis of the axle housing. Alternatively, a ball joint which permits a mobility of the side stabilizer in a plurality of directions may be provided at the bearing point, in particular also a lateral movement approximately in a vehicle transverse direction which runs parallel to the rear axle.

The bearing bracket may be produced from different materials and by different manufacturing methods. In particular, the bearing bracket is produced from a metal material or a metal alloy as a forged part, welded part or cast part.

The parallel orientation of the clamping force and the traction force is provided relative to a transverse plane which is arranged transversely to the central longitudinal axis of the axle housing. This transverse plane may be arranged at any angle >0° to the central longitudinal axis of the axle housing. In this case, a parallelism of the clamping force and the traction force relative to the transverse plane is provided in at least one bearing position of the side stabilizer in the installed operating position.

Naturally, depending on the design of the articulated connection at the bearing point and the forces acting thereon, it is conceivable that in the installed operating position the side stabilizer may also adopt other bearing positions in which the clamping force and the traction force are not oriented in parallel relative to the transverse plane.

Moreover, in one embodiment, the clamping force and the traction force are oriented parallel relative to an axle plane containing the central longitudinal axis of the axle housing. It also applies here that this parallel orientation is provided in at least one specific bearing position of the side stabilizer in the installed operating position of the bearing arrangement, while due to the articulated connection at the bearing point in the installed operating position the side stabilizer may naturally also adopt other bearing positions in which the clamping force and the traction force are not oriented in parallel relative to the axle plane.

Generally, the axle housing is fixedly connected to a supporting structure (for example, a chassis, support frame) of the utility vehicle. As a result, the bearing bracket is also able to be fixedly connected to the support structure of the utility vehicle. In this case, the mechanical connection between the axle housing and the bearing bracket is configured, in particular, to be releasable. As a result, individual components of the bearing arrangement may be serviced and replaced, if required, in a manner which is easy to implement.

In another embodiment, the mechanical connection or the clamping force between the axle housing and the bearing bracket is implemented by at least one clamping pin (in particular, a clamping screw). These clamping mechanisms may be provided cost-effectively as standard components.

For a mechanical connection which is simple in terms of construction technology, the at least one clamping pin is provided, in particular, with an external thread which cooperates with an internal thread borne by the axle housing.

In the case of a plurality of clamping pins used, these clamping pins are arranged with a parallel spacing from one another in their mounted state. This assists an efficient clamping force and mechanical connection with a small degree of effort in terms of suitable connecting or clamping means.

In a further embodiment, the axle housing bears at least one outwardly oriented connecting extension in order to be able to apply and fasten the bearing bracket in a simple and accurate manner in terms of mounting technology onto the axle housing or the connecting extension thereof. A convenient mounting plane for the bearing bracket may be provided by the at least one connecting extension. In particular, the mounting plane effects a plane-parallel, flat bearing between the connecting extension(s) and the bearing bracket. The connecting extension(s) permit(s) a simple adaptation of the bearing bracket in terms of construction technology to the axle housing so that the production of the bearing bracket itself does not have to be adapted to specific cross-sectional paths of the axle housing.

In a further function, the connecting extension itself is provided with an internal thread which may cooperate with an external thread of an aforementioned clamping pin. As a result, the mounting effort for the mechanical connection between the axle housing and the bearing bracket is kept small.

In another embodiment, the housing casing of the axle housing is configured to be at least partially in the manner of a truncated cone, having a truncated cone axis which corresponds to the central longitudinal axis. The axle housing may thus be denoted as an axle funnel. In addition, any other shaping which corresponds to the respective application is also conceivable.

A positive connection is at least partially configured between the axle housing and the bearing bracket. For example, in an embodiment of a positive connection, a spindle or pin of the bearing bracket may engage in a recess configured as a negative relief on the axle housing. The positive connection assists a handling of the bearing bracket which is easy to implement and also a design of the bearing arrangement as a space-saving compact unit.

As already mentioned, the bearing arrangement is a component of an agricultural utility vehicle which is configured, in particular, as a tractor or towing vehicle. A side stabilizer which stabilizes a power lift coupled to the utility vehicle is mounted on the bearing bracket. The power lift is configured, in particular, as a three-point power lift with an upper link arm and two parallel lower link arms. At least one of the two lower link arms is connected in an articulated manner to a side stabilizer.

The clamping force is oriented perpendicularly, i.e., horizontally, relative to a vertical plane of the utility vehicle. The clamping force encloses an acute angle with a vehicle longitudinal direction in an imaginary horizontal plane of the utility vehicle. This angle is adapted, in particular, to an orientation of the side stabilizer relative to the vehicle longitudinal direction.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
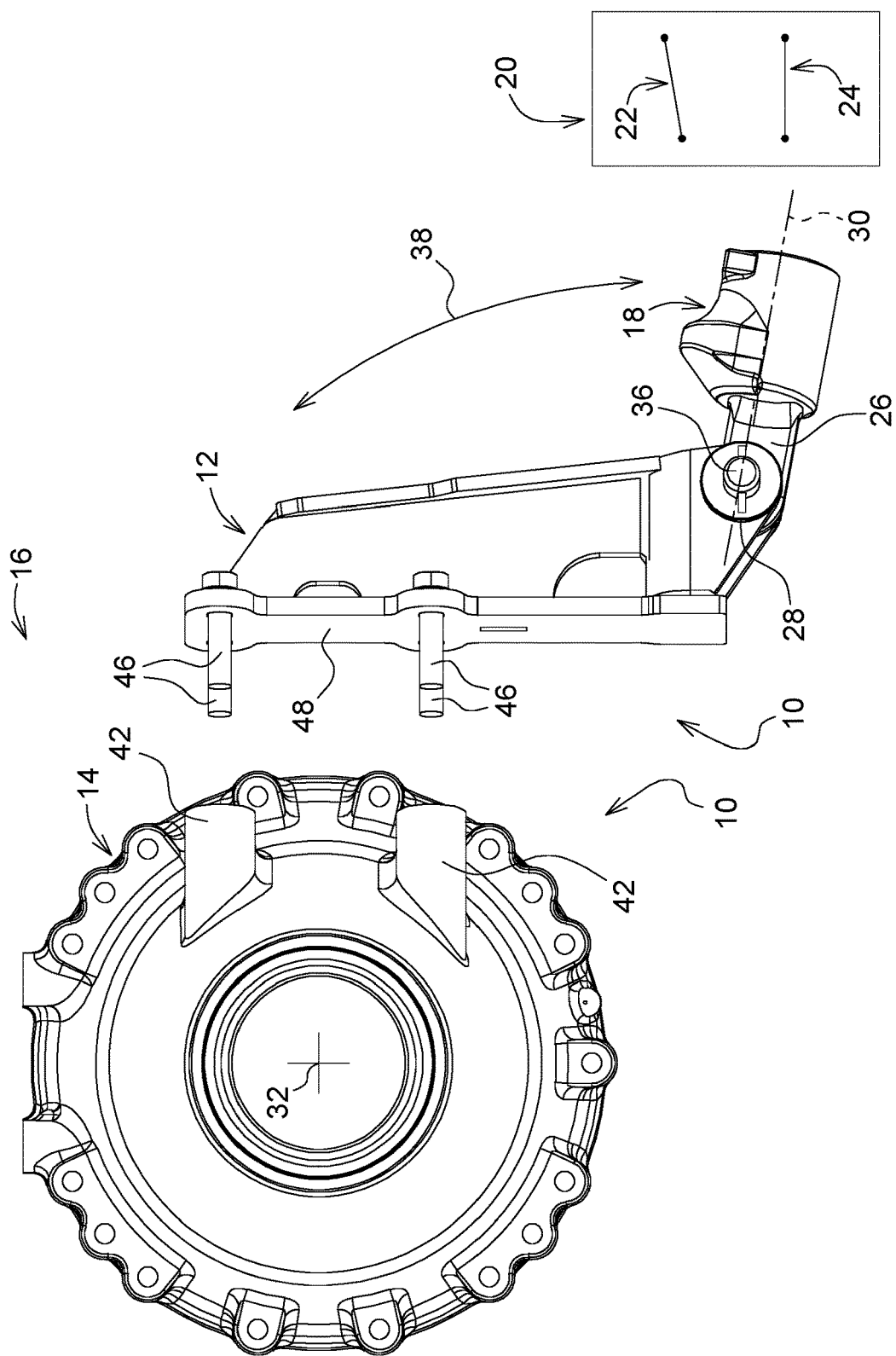
FIG. 1 shows a side view of the bearing arrangement in an exploded state.

FIG. 1 shows a bearing arrangement 10 having a bearing bracket 12 and an axle housing 14 in an exploded state. In an installed operating position, however, the two components 12, 14 are fixedly connected together (FIG. 3) and are releasable again from one another. Since in the installed operating position the axle housing 14 is fixedly connected to a supporting structure of an agricultural utility vehicle 16, indicated here schematically, the bearing bracket 12 is also fixedly and immovably arranged relative to the supporting structure.

The bearing bracket 12 serves for bearing a side stabilizer 18, which is partially shown here and which in the installed operating position of the bearing arrangement 10 effects a mechanical coupling of the bearing bracket 12 to a rear power lift 20. The rear power lift 20 is indicated schematically and is configured, in particular, as a three-point power lift. The rear power lift thus contains in the conventional manner an upper link arm 22 and two lower link arms 24.

With its free end 26, which may be identified in FIG. 1, the side stabilizer 18 is movably articulated on a bearing point 28 of the bearing bracket 12. The free end of the side stabilizer 18 opposing the free end 26 along the stabilizer longitudinal axis 30, and not identifiable here, is articulated in a movable manner on one of the two lower link arms 24. Depending on the embodiment of the utility vehicle 16 or the rear power lift 20, the utility vehicle 16 either bears a bearing bracket 12 for the mechanical coupling with a lower link arm 24 or two bearing brackets 18 for a mechanical coupling with the two lower link arms 24.

Figure 2:
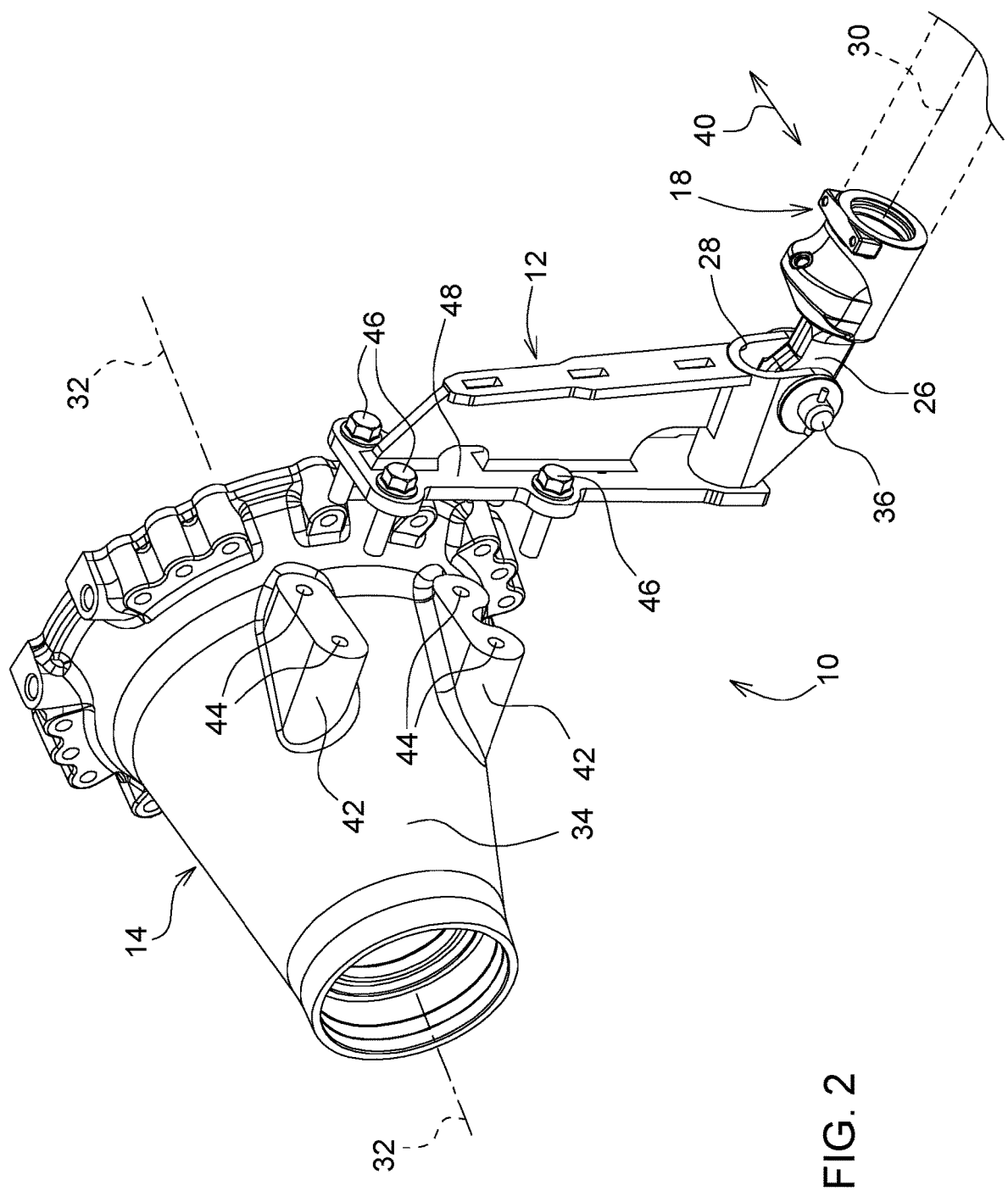
FIG. 2 shows a perspective view of the bearing arrangement according to FIG. 1.

The axle housing 14 approximately concentrically surrounds a rear axle of the utility vehicle 16, which is represented by a central longitudinal axis 32 of the axle housing 14. In FIG. 2 it may be identified that the axle housing 14, also denoted as the axle funnel, has a housing casing 34 which is configured in the manner of a truncated cone.

It may also be derived from FIG. 2 that the bearing point 28 is configured to be U-shaped with two U-shaped limbs, the free end 26 being movably mounted therebetween. To this end, the two U-shaped limbs are penetrated by a bearing bolt 36. As a result, the side stabilizer 18 is pivotally movable in a pivoting direction 38. The bearing point 28 or the free end 26 is configured (for example, by a ball joint-type bearing) such that the side stabilizer 18 may additionally perform a lateral movement, for example in a lateral direction 40.

In a region facing the bearing bracket 12 the axle housing 14 bears two dome-like connecting extensions 42 spaced apart from one another. Starting from the housing casing 34 these connecting extensions are oriented outwardly and in each case contain two internal threads 44. Each internal thread 44 cooperates with a clamping pin 46 which has a corresponding external thread for the assembly of the bearing arrangement 10.

For example, a total of four clamping pins 46, which are arranged in parallel relative to one another, penetrate a plate-like bracket base 48 which is applied against the connecting extensions 42 for mounting the bearing bracket 12. The connecting extensions 42 are dimensioned such that they form a mounting plane for the bearing bracket 12 which is easy to handle. In an alternative embodiment, not shown here, the bracket base 48 may be designed and the connecting extensions 42 may be adapted and positioned such that between the housing casing 34 and the bracket base 48 a positive connection is at least partially produced during assembly. For example, this positive connection is implemented by the bracket base 48 running in an arcuate manner and bearing as a negative relief against the housing casing 34. In a further embodiment of a positive connection, a spindle or pin of the bearing bracket 12 may engage in a recess configured as a negative relief on the axle housing 14.

Figure 3:
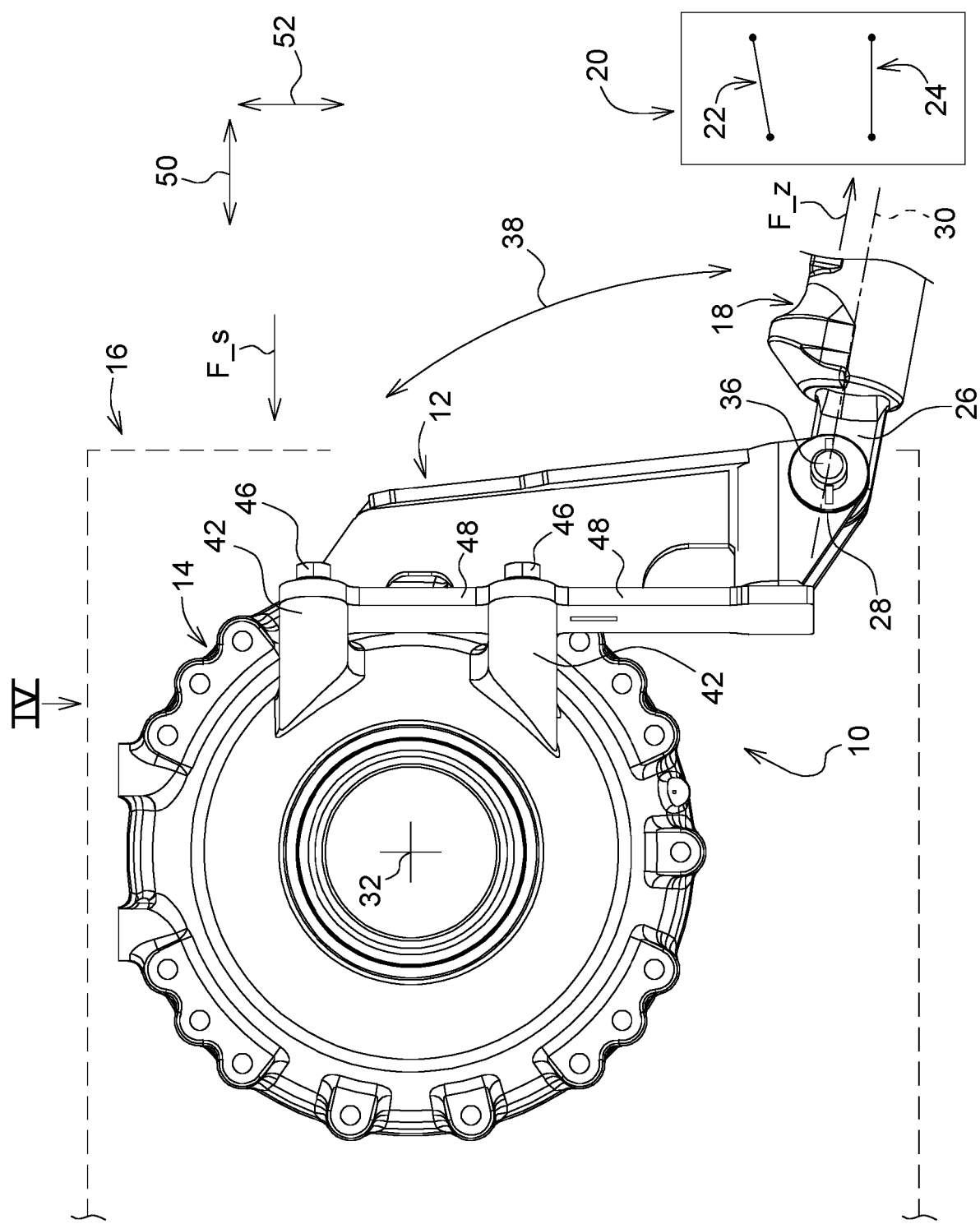
FIG. 3 shows the bearing arrangement according to FIG. 1 in an assembled state.

In FIG. 3, the bearing arrangement 10 is in its installed operating position on the utility vehicle 16. In this case, the bearing bracket 12 is fixedly connected to the axle housing 14 by a clamping force F_s generated by the clamping pins 46. For releasing the fixed connection, the clamping pins 46 are removed again from the connecting extensions 42.

In the view according to FIG. 3 the clamping force F_s is located approximately in a horizontal plane which is arranged parallel to an axle plane spanned by the central longitudinal axis 32 and by a horizontal vehicle longitudinal direction 50. A traction force F_z produced by the side stabilizer 18 and the rear power lift 20 acts on the bearing point 28. Due to the specific bearing position of the side stabilizer 18 in FIG. 3, the traction force F_z encloses an acute angle with the clamping force F_s.

The side stabilizer 18 is pivotal in the pivoting direction 38 and, therefore, may adopt different bearing positions in a vehicle vertical direction 52. In a specific bearing position, not shown here, in the view according to FIG. 3 the stabilizer longitudinal axis 30 runs parallel to the clamping force F_s. In this bearing position the clamping force F_s and the traction force F_z would be oriented parallel to the aforementioned axle plane containing the central longitudinal axis 32.

Figure 4:
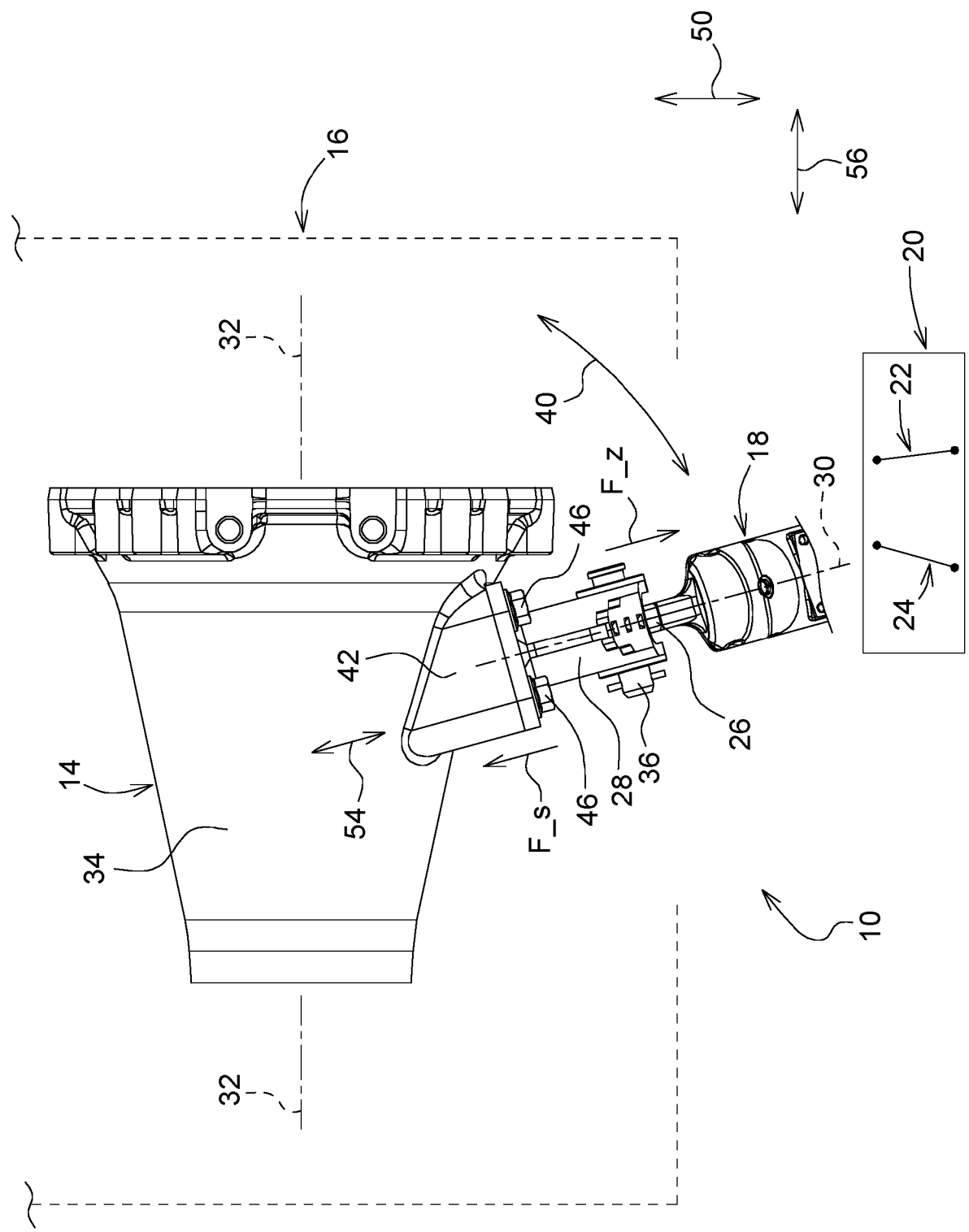
FIG. 4 shows a plan view of the bearing arrangement corresponding to the direction of the arrow IV in FIG. 3.

In FIG. 4 it may be identified that the clamping force F_s is located in a transverse plane which is spanned by the vehicle vertical direction 52 and by a clamping force direction 54 running in the direction of the clamping force F_s. This transverse plane is thus arranged transversely but not perpendicularly to the central longitudinal axis 32. Accordingly, whilst the clamping force F_s is located approximately in a plane spanned by the vehicle longitudinal direction 50 and by a vehicle transverse direction 56 it does not run parallel to the vehicle longitudinal direction 50.

If the side stabilizer 18 is not pivoted out or is not able to be pivoted out laterally in the lateral direction 40, the clamping force F_s and the traction force F_z are oriented parallel to the aforementioned transverse plane.

It should be mentioned that individual details in the drawings are not necessarily shown to scale.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A bearing arrangement for a side stabilizer of a rear power lift for an agricultural utility vehicle, comprising:
   a movable bearing of the side stabilizer;
   a bearing bracket for the bearing, the bearing bracket being disposable in an installed operating position to achieve a mechanical coupling of the bearing bracket with the rear power lift; and
   an axle housing comprising a central longitudinal axis for a rear axle of the utility vehicle;
   wherein the bearing bracket comprises a bearing point for the movable bearing of the side stabilizer and is connected to the axle housing by a clamping force;
   wherein the clamping force is oriented parallel to a traction force acting on the bearing point in the installed operating position.

2. The bearing arrangement as claimed in claim 1, wherein the clamping force and the traction force are oriented in parallel relative to a plane arranged transversely to the central longitudinal axis of the axle housing.

3. The bearing arrangement as claimed in claim 1, wherein the clamping force and the traction force are oriented in parallel relative to a plane which contains the central longitudinal axis of the axle housing.

4. The bearing arrangement as claimed in claim 1, wherein the connection between the bearing bracket and the axle housing is releasable.

5. The bearing arrangement as claimed in claim 1, further comprising one or more clamping pins for connecting the axle housing to the bearing bracket.

6. The bearing arrangement as claimed in claim 5, wherein the one or more clamping pins are arranged with a parallel spacing from one another.

7. The bearing arrangement as claim in claim 1, wherein the axle housing bears at least one outwardly oriented connecting extension for bearing the bearing bracket.

8. The bearing arrangement as claimed in claim 7, wherein the connecting extension comprises at least one internal thread for a clamping pin.

9. The bearing arrangement as claimed in claim 1, wherein the axle housing comprises a housing casing formed at least partially as a truncated cone.

10. The bearing arrangement as claimed in claim 9, wherein the truncated cone axis is defined along the central longitudinal axis.

11. The bearing arrangement as claimed in claim 1, further comprising a positive connection at least partially formed between the axle housing and the bearing bracket.

12. An agricultural utility vehicle, comprising:
a side stabilizer of a rear power lift;
a bearing arrangement for the side stabilizer, the bearing arrangement comprising:
   a movable bearing of the side stabilizer;
   a bearing bracket for the bearing, the bearing bracket being disposable in an installed operating position to achieve a mechanical coupling of the bearing bracket with the rear power lift;
   an axle housing comprising a central longitudinal axis for a rear axle of the utility vehicle;
   wherein the bearing bracket comprises a bearing point for the movable bearing of the side stabilizer and is connected to the axle housing by a clamping force;
   wherein the clamping force is oriented parallel to a traction force acting on the bearing point in the installed operating position.

13. The vehicle as claimed in claim 12, wherein the clamping force and the traction force are oriented in parallel relative to a plane arranged transversely to the central longitudinal axis of the axle housing.

14. The vehicle as claimed in claim 12, wherein the clamping force and the traction force are oriented in parallel relative to a plane which contains the central longitudinal axis of the axle housing.

15. The vehicle as claimed in claim 12, wherein the connection between the bearing bracket and the axle housing is releasable.

16. The vehicle as claimed in claim 12, further comprising one or more clamping pins for connecting the axle housing to the bearing bracket.

17. The vehicle as claimed in claim 16, wherein the one or more clamping pins are arranged with a parallel spacing from one another.

18. The vehicle as claimed in claim 12, wherein the axle housing bears at least one outwardly oriented connecting extension for bearing the bearing bracket.

19. The vehicle as claimed in claim 18, wherein the connecting extension comprises at least one internal thread for a clamping pin.

20. A bearing arrangement for a side stabilizer of a rear power lift for an agricultural utility vehicle, comprising:
a movable bearing of the side stabilizer;
a bearing bracket for the bearing, the bearing bracket being disposable in an installed operating position to achieve a mechanical coupling of the bearing bracket with the rear power lift;
an axle housing comprising a central longitudinal axis for a rear axle of the utility vehicle, where a positive connection is formed between the axle housing and the bearing bracket; and
one or more clamping pins for connecting the axle housing to the bearing bracket;
wherein the bearing bracket comprises a bearing point for the movable bearing of the side stabilizer and is connected to the axle housing by a clamping force;
wherein the clamping force is oriented parallel to a traction force acting on the bearing point in the installed operating position.

* * * * *